Dec. 26, 1967   P. TILLMANN ET AL   3,360,341
MEANS FOR THE PRODUCTION OF FINE PARTICLE
SIZE TITANIUM DIOXIDE
Filed March 20, 1964

INVENTORS
Gerhard Hitzemann
Achim Kulling
Peter Tillmann (deceased)
by Margaret Tillmann, sole heir BY *Harold L. Fammons*

AGENT

United States Patent Office 3,360,341
Patented Dec. 26, 1967

3,360,341
MEANS FOR THE PRODUCTION OF FINE PARTICLE SIZE TITANIUM DIOXIDE
Peter Tillmann, deceased, late of Leverkusen, Germany, by Margarete Tillmann, sole heir, Cologne-Deutz, Germany, and Achim Kulling and Gerhard Hitzemann, Leverkusen, Germany, assignors to Titangesellschaft m.b.H., Leverkusen, Germany, a corporation of Germany
Filed Mar. 20, 1964, Ser. No. 353,622
Claims priority, application Germany, Mar. 21, 1963, T 23,670
1 Claim. (Cl. 23—277)

The present invention relates in general to the production of pigmentary titanium dioxide and more particularly to an improved multi-tube burner for producing pigmentary titanium dioxide by vapor phase reaction of gaseous titanium tetrachloride and oxygen in the presence of an auxiliary flame.

Various methods have been used heretofore for producing titanium dioxide by reacting titanium tetrachloride with oxygen or oxygen containing gases. For example titanium tetrachloride has been reacted with oxygen in a so-called vapor phase reaction by preheating gaseous $TiCl_4$ and gaseous oxygen to relatively high temperatures prior to mixing. However at these relatively high temperatures the gaseous $TiCl_4$ and oxygen are especially reactive and as a consequence create serious corrosion problems and require expensive materials of construction. Moreover the $TiO_2$ product produced by reacting separately preheated gases on a commercial scale has never been of satisfactory quality.

Some improvement in the quality of the $TiO_2$ product has been achieved by modifying the construction of the burner such that at least one of the gases is given a rotational or spiral movement so as to effect a more complete mixing of the respective gases at reaction. Another expedient has been to use an auxiliary flame to provide the heat necessary for reacting gaseous $TiCl_4$ and oxygen thereby avoiding the necessity for preheating the $TiCl_4$ and oxygen to reaction temperature, with the accompanying corrosion and materials construction problems.

A further alternative has been to modify the auxiliary flame technique by adding part of the oxygen to the $TiCl_4$ gas stream before the gases are reacted. However quality pigment i.e. $TiO_2$ pigment of high tinting strength and rutile content can be produced only when the $TiCl_4$-oxygen gas stream is 10 mm. or less in diameter. Because of this limitation efforts to meet the requirement for greater volumes of gas for commercial scale production have led to the use of burners of extremely complicated design which are unsatisfactory both from the standpoint of expense and poor reliability. Also systems of this type must resort to the use of vaporous $AlCl_3$ in order to achieve the necessary rutile content. Some improvement in tinting strength has been obtained by using a considerable excess of oxygen but this expedient is expensive and in addition the off-gases from the reaction are undesirably high in oxygen such that if used in a chlorinator for the production of $TiCl_4$ the gases from the chlorinator will be undesirably diluted, the consumption of carbon will be increased and the fluid bed of the chlorinator will be overheated.

While each of the aforementioned techniques have contributed some measure of improvement in pigment quality on a laboratory scale, efforts to produce high quality pigment by these techniques on a commercial scale have met with little or no success.

An object therefore of the present invention is to provide an improved method and means for producing high quality titanium dioxide pigmentary material by a vapor phase reaction of titanium tetrachloride and oxygen, economically and on a commercial scale for relatively long periods of operation.

A further object of the invention is to provide an improved multi-tube burner for the production of fine particle size titanium dioxide by combustion of gaseous titanium tetrachloride with oxygen, or gases containing oxygen, in a reaction chamber in the presence of an auxiliary flame for maintaining combustion wherein the burner is not limited to a gas stream of prescribed thickness and is of simple and inexpensive construction.

Other objects, features and advantages of the invention will be revealed in the description of the invention which follows in which.

In its broadest aspects the instant invention relates to a method and means for producing $TiO_2$ of the fine particle size, by reacting gaseous $TiCl_4$ and oxygen, or an oxygen containing gas, in a reaction chamber in the presence of an auxiliary flame for supporting the reaction the method being characterized by maintaining the linear velocity of the oxygen, or oxygen containing gas, at the mouth of the burner higher than the linear velocity of the gaseous $TiCl_4$ and combustible gas; the means employed comprising a multi-tube burner characterized by at least three substantially concentric coaxially arranged tubes through which the respective gases are passed unmixed; and means for forming a restricted orifice in the oxygen gas passage for increasing the exit velocity of the oxygen therefrom.

While it is not fully understood why an increase in the linear velocity of the oxygen over the linear velocity of the gaseous $TiCl_4$ and combustible gas at the mouth of the burner should produce a superior $TiO_2$ pigment it is postulated that the improvement may be due to a suction effect produced on the adjacent streams of $TiCl_4$ and combustible gas causing a more intensive mixing of the respective gases and hence an increase in nuclear formation and a more rapid conversion of the mixed gases to pigmentary grade $TiO_2$.

Figure 1:
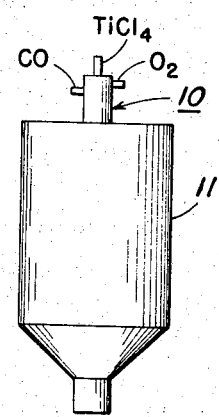
FIG. 1 is a diagrammatic view of a burner-reactor assembly.

Referring to FIG. 1 of the drawing, the improved multi-tube burner of this invention is identified generally by the numeral 10 and is adapted to be mounted on the upper end of the reaction chamber 11 for producing titanium dioxide by a vapor phase reaction of titanium tetrachloride and oxygen. The burner 10 comprises three axially arranged tubes 12, 13 and 14 respectively, each of a different overall diameter and in the present embodiment arranged substantially concentric with respect to each other. For purposes of identification tube 12 will be hereafter referred to as the inner tube, tube 13 as the intermediate tube and tube 14 as the outer tube. Each tube is made of a suitable material to withstand relatively high temperatures and to this end may be made of a heat resistant steel, a nickel alloy or possibly silica or other suitable ceramic materials. The diameters of the respective tubes are also selected so as to provide an annular gas passage 15 between the inner tube 12 and the intermediate tube 13; and an annular gas passage 16 between the intermediate tube 13 and the outer tube 14. The bore 17 of the inner tube 12 constitutes a third gas passage. The upper ends (not shown) of the tubes 12, 13 and 14 of the burner 10 are adapted to be connected to suitable gas sources, hereafter described, which feed the respective gases through the gas passages in separate streams.

Figure 2:
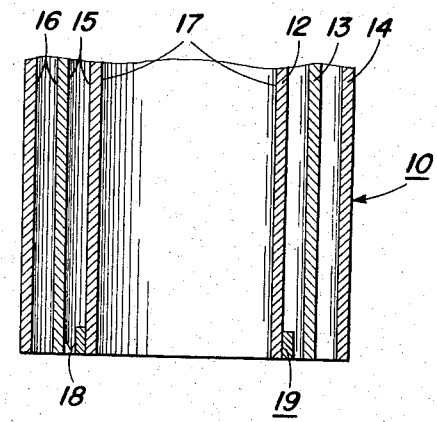
FIG. 2 is an enlarged diagrammatic showing, in vertical longitudinal section, of one form of the improved multi-tube burner of this invention.

Referring to FIG. 2 the open or exit ends of the respective tubes constitute the mouth of the burner and are substantially flush and the gas passages 16 and 17 for the CO and gaseous TiCl₄ respectively are unrestricted. However pursuant to the discovery of the instant invention the gas passage 15 for the oxygen or oxygen containing gases, is provided with a restricted orifice in the form of a relatively narrow annular slot 18 at its exit end. The manner or means whereby this restricted orifice is formed in the oxygen gas passage 15 is immaterial. It is essential however that it be at the exit end of the gas passage 15 so as to increase the linear velocity of the oxygen as it exits from the mouth of the burner. The invention also contemplates the use of restricted orifices of different dimensions to effect different exit velocities in accordance with variations in the linear velocities of the other gases. In general the size of the orifice or annular slot 18 is quite small, e.g. from about 0.75 mm. to about 2.00 mm. and hence presents fabrication problems particularly with regard to uniformity of size necessary for a homogeneous product.

However in accordance with the discoveries of the instant invention it has been found that an annular slot 18 of any desired width may be formed by the simple expedient of locating peripheral means in the form of an annular lip-like member or suitably dimensioned ring or rings at the exit end of the oxygen gas passage 15. Thus, for example, the peripheral means shown in FIG. 2 comprises a ring 19 substantially rectangular in cross section, mounted on the outer periphery of the inner tube 12 at its exit end thereby forming the annular slot 18 in the oxygen gas passage 15. The significant dimension of the ring is its thickness which in conjunction with the tube wall opposite the ring, determines the width of the annular slot 18. The height of the ring has no significant effect on the gas flow or quality of product. Any suitable means may be employed for retaining the ring 19 on the end of the inner tube 12 as for example by welding or by a screw threaded connection. The latter expedient is especially advantageous since it facilitates substituting rings of different thicknesses whereby the exit velocity of the oxygen, of a given burner, may be varied in accordance with variations in the linear velocity of the gaseous TiCl₄.

Figure 3:
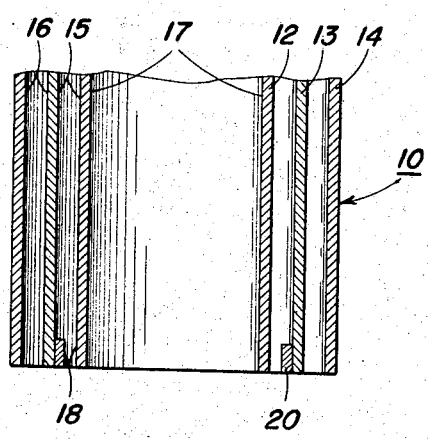
FIG. 3 is an enlarged diagrammatic showing, in vertical longitudinal section, of a modification of the burner construction shown in FIG. 2.
Figure 4:
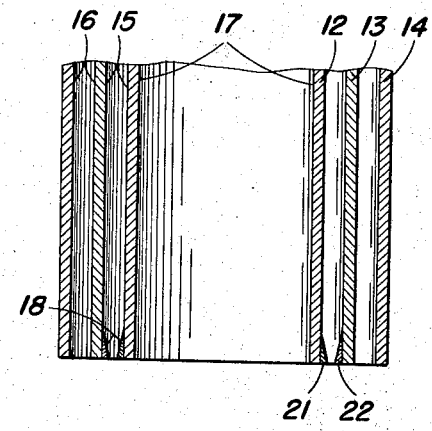
FIG. 4 is an enlarged diagrammatic showing, in vertical longitudinal section, of a further modification of the burner construction shown in FIG. 2.

FIGS. 3 and 4 illustrate alternative arrangements for forming the annular slot 18. In the modification shown in FIG. 3 a ring 20 is used which is similar in structure and function to the ring 19 of FIG. 2 but is secured to the inner periphery of the intermediate tube 13 at its exit end. In FIG. 4 is shown a further modification wherein the annular slot 18 is formed by mounting rings 21 and 22 at the exit ends of the inner tube 12 and intermediate tube 13 respectively. In this embodiment of the invention the rings are triangular in cross section and arranged to form an annular slot 18 having a relatively wide entrance and relatively narrow exit. As with the rings of FIGS. 2 and 3 the rings 21 and 22 may be screw threaded or welded on to the lower extremities of the tubes 12 and 13.

In each embodiment the effect of the relatively narrow annular slot 18 at the exit end of the oxygen gas passage 15 is to increase the linear velocity of the oxygen and thus create a forceful, expanding, vortex of gas which produces an intimate mixing of the gaseous TiCl₄ and oxygen and a relatively short flame which is essential to the production of fine particle size TiO₂. It has been found, for example, that when the linear velocity of the gaseous TiCl₄ is greater than that of the oxygen and combustible gas a relatively long flame is formed in which case the TiO₂ is wholly unsatisfactory as pigmentary material.

As mentioned above whereas the burners of the prior art, which use a mixture of gaseous titanium tetrachloride and oxygen, have been limited to a gas stream no greater than 10 mm. thick the burner of this invention has no such limitation and hence is adaptable to large scale production; and since it is not necessary to premix the gaseous TiCl₄ and oxygen it is possible to avoid a reduction in the relative velocities of the TiCl₄ and O₂ such as would be inevitable were there a partial premixing of the O₂ and TiCl₄.

In this connection the gaseous titanium tetrachloride is fed into the inner tube 12 of the burner 10 preferably without admixture with oxygen and in lieu thereof additions of other gases as for example silicon tetrachloride and/or aluminum trichloride may be added for affecting improvement in pigment quality. The oxygen required for conversion of the titanium tetrachloride to titanium dioxide is fed into the annular gas passage 15. Carbon monoxide is mostly commonly employed as the combustible gas for maintaining the auxiliary flame in the reaction chamber, and is fed into the annular gas passage 16 of the burner. It will be understood that other gases such as hydrogen, hydrogen containing gases, hydrocarbons or mixtures of these gases may be used also in lieu of carbon monoxide for supporting the auxiliary flame.

As will be seen from the drawings the burner according to this invention is of relatively simple and economical construction and although the respective feed tubes 12, 13 and 14 are shown is substantially concentric relationship an exact concentricity is not mandatory; nor is it necessary to obtain equalization of the circumferential gas velocities of the oxygen and carbon monoxide.

In operation, the gases exiting from the open ends of the gas passages 15, 16 and 17 respectively of the multi-tube burner are thoroughly mixed, due to the turbulent effect of the relatively high velocity oxygen stream; and react in the presence of the auxiliary flame formed by the combustible gas i.e. CO, to produce fine particle size TiO₂ having excellent pigmentary properties. In this connection it has been found that an increase in the ratio of the linear velocities of the oxygen and gaseous TiCl₄ above about 1:1 has the effect of decreasing the particle size of the pigment. A linear velocity ratio of about 2:1 has been found to produce pigments having satisfactory tinting strength values while ratios below about 1.1:1 are entirely unsatisfactory. Ratios above 2:1 effect further increases in tinting strength values the upper limit, in the present embodiment of the invention, being about 8:1 which is determined by the burner design and operating conditions. While the operating conditions normally employed use stoichiometric amounts of oxygen to give substantially complete conversion, a slight excess of oxygen i.e. about 2–5% may be employed beneficially in order to eliminate fluctuations in the gas feed rates. Oxygen in amounts above 2–5% excess are not recommended since they adversely effect the stability of the flame.

In the embodiments of the invention described herein and illustrated by the examples below the linear velocity of the oxygen ranges from 31.4 to 77.0 m./sec. and the linear velocity of the gaseous TiCl₄ from 8.5 to 11.4 m./sec., the ratios of linear velocities of the respective gases ranging from 2.0 to 8.2 to one for producing satisfactory pigmentary TiO₂.

The examples which follow will further illustrate the novelty and superior operation of the burner of this invention. In these examples the tinting strength of the pigments obtained were determined according to the following standardized test method.

Tinting strength test

The pigment to be tested was made into a paste with a mixture of carbon black, calcium carbonate and linseed oil; and was then compared visually with a standard paste. The standard paste was prepared with a definite amount of a standard pigment. The amount of pigment used in the test paste was varied until the brightness of this test paste equalled that of the standard paste. The tinting strength was calculated from the amount of the pigment required for equality of brightness of the two pastes. The higher the tinting strength, the better the pigment, a good pigment being one having at least a value of 1625 by this test.

EXAMPLE 1

In this example a multi-tube burner was used consisting of three coaxially arranged cylindrical tubes, having the following dimensions:

|  | Inner tube (mm.) | Intermediate tube (mm.) | Outer tube (mm.) |
|---|---|---|---|
| I.D. | 33 | 42.5 | 57 |
| Wall thickness | 2 | (1) | 2.5 |

[1] Knife edge.

In this embodiment an annular slot 18 was formed at the exit end of the oxygen passage 15 by means of a ring 19 fastened on the outer wall of the inner tube 12 the O.D. (outer diameter) of the ring being 41 mm. and its thickness 5 mm.

100 kgc./hr. of $TiCl_4$, preheated to 350° C., were passed through the inner tube 12 at a linear velocity of 11.4 m./second. 17 std. cu. m./hr. of oxygen, preheated to 345° C., were fed through the gas passage 15 of the intermediate tube 13 at a linear velocity of 31.4 m./sec. Carbon monoxide in the amount of 9.6 std. cu. m./hr. at 20° C. was fed through the outer gas passage 16 at a linear velocity of 3.8 m./sec.

The ratio of the linear velocities of the oxygen and $TiCl_4$ issuing from the mouth of the burner was 2.76:1. The oxygen was 2.3% in excess of the stoichiometric amount.

The $TiO_2$ product obtained had a rutile content of 85% and a tinting strength of 1625.

EXAMPLE 2

The multi-tube burner used in this example had the following dimensions:

|  | Inner tube (mm.) | Intermediate tube (mm.) | Outer tube (mm.) |
|---|---|---|---|
| I.D. | 33 | 45 | 57 |
| Wall thickness | 2 | 2.5 | 2.5 |

A restricted orifice 18 was formed in the oxygen gas passage 15 by securing a ring 19 on the lower extremity of the inner tube 12 as in Example I above. The width of the annular slot 18 was thus 2.0 mm.

75 kgs./hr. of $TiCl_4$, preheated to 350° C. were passed through the inner tube 12 at a linear velocity of 8.5 m./sec. 14 std. cu. m./hr. of oxygen, preheated to 340° C., were fed through the gas passage 15 of the intermediate tube 13 at a linear velocity of 48.1 m./sec. Carbon monoxide in the amount of 9.3 std. cu. m./hr. at 20° C. was fed through the outer gas passage 16 at a linear velocity of 4.8 m./s. The ratio of the linear velocities of the oxygen and $TiCl_4$ issuing from the mouth of the burner was 5.7:1. The oxygen used was 3.6% in excess of the stoichiometric amount.

The $TiO_2$ product had a rutile content of 92% and a tinting strength of 1675.

EXAMPLE 3

In this example the same burner was used as in Example 2 but in this run 100 kgs./hr. $TiCl_4$, at a temperature of 250° C., were passed through the inner tube 12 at a linear velocity of 9.4 m./s. 24 std. cu. m./hr. oxygen, preheated to 300° C., were fed through the gas passage 15 at a linear velocity of 77 m./s. and 25 std. cu. m./hr. CO at 20° C. were fed through the outer gas passage 16 at a linear velocity of 12.9 m./sec.

The ratio of linear velocities of the oxygen and $TiCl_4$ issuing from the mouth of the burner was 8.2:1. The oxygen was 5.0% in excess of the stoichiometric amount.

The $TiO_2$ product had a rutile content of 94% and a tinting strength of 1675.

EXAMPLE 4

To show the effect of operating the multi-tube burner at a ratio of linear velocities of oxygen to $TiCl_4$ less than about 2:1 a burner was used wherein the ends of the tubes terminated in knife-edges the diameters of which were 29 mm., 42.5 mm. and 54.5 mm. respectively.

100 kgs./hr. $TiCl_4$, preheated to 350° C., were fed through the inner tube 12 at a linear velocity of 11.4 m./sec., 17 std. cu. m./hr. oxygen at 275° C. were fed through the intermediate gas passage 15 at a linear velocity of 12.5 m./sec.; and 8.7 std. cu. m./hr. CO at 20° C. were fed through the outer gas passage at a linear velocity of 2.6 m./s.

Under these conditions the ratio of linear velocities of oxygen to $TiCl_4$ was 1.1:1. The oxygen was 4.7% in excess of the stoichiometric amount.

The product obtained was only 80% rutile and had a tinting strength of 1300.

The invention may be carried out in other specific ways than those herein set forth without departing from the spirit and essential characteristics of the invention, and the present embodiments are therefore, to be considered in all respects as illustrative and not restrictive and all changes coming within the meaning and equivalency range of the appended claim are intended to be embraced therein.

What is claimed is:

A multi-tube burner for use in the manufacture of fine particle size $TiO_2$ by combustion of gaseous $TiCl_4$ with oxygen, or oxygen containing gases, in a reaction chamber in the presence of an auxiliary flame for maintaining combustion said burner comprising at least three tubular members arranged coaxially and with their walls spaced radially with respect to each other thereby providing annular gas passages between the respective tubes, the gaseous $TiCl_4$ being fed through the innermost tube of the burner, and the oxygen or oxygen containing gases and the combustible gas being fed through the annular gas passages surrounding the innermost tube of the burner; and peripheral means for forming a restricted orifice in said oxygen gas passage comprising a pair of rings constructed and arranged to be mounted on the opposed walls respectively of two of said burner tubes at the exit ends thereof and to extend radially into the said oxygen gas passage.

References Cited

UNITED STATES PATENTS 2,360,548  10/1944  Conway _____ 158—117.5 XR
2,598,787  6/1952  Haak _____ 158—110 XR
3,141,741  7/1964  Hoel et al. _____ 23—253

JAMES H. TAYMAN, Jr., *Primary Examiner.*

MORRIS O. WOLK, *Examiner.*